F. D. GRANGER.
TRIGGER MECHANISM FOR GUNS.
No. 11,458.
Reissued Dec. 11, 1894.
Fig. 1.
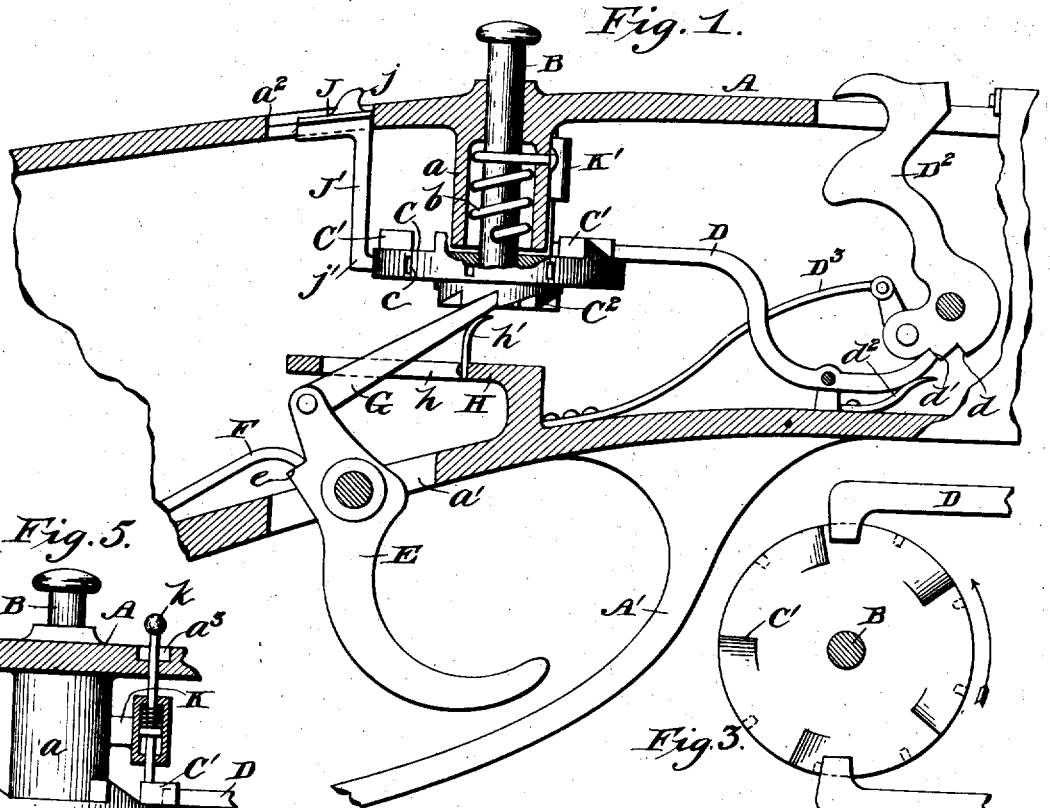
Fig. 5.
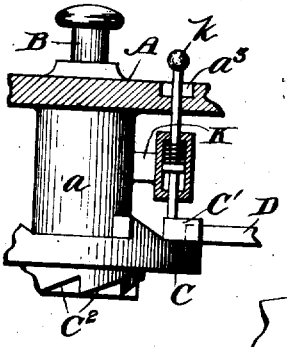
Fig. 3.
Fig. 2.
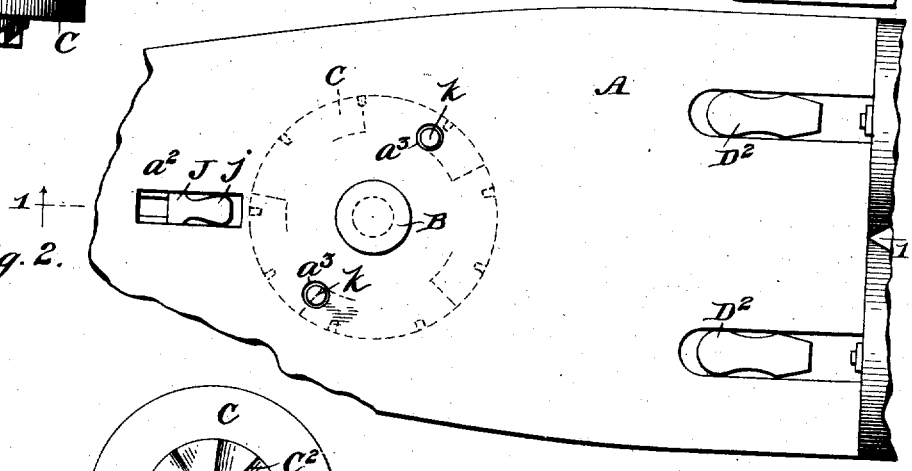
Fig. 4.
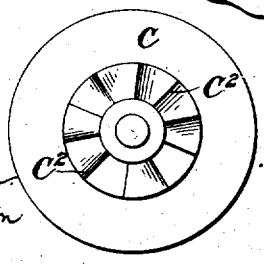
Witnesses
Severance.
C. R. Ferguson
Inventor
Frank D. Granger
By Henry F. Parker
Attorney

UNITED STATES PATENT OFFICE.

FRANK D. GRANGER, OF NEW YORK, N. Y., ASSIGNOR OF ONE-HALF TO HALLACK A. PENROSE, OF NEW LONDON, CONNECTICUT.

TRIGGER MECHANISM FOR GUNS.

SPECIFICATION forming part of Reissued Letters Patent No. 11,458, dated December 11, 1894.

Original No. 456,813, dated July 28, 1891. Application for reissue filed March 6, 1893. Serial No. 464,898.

*To all whom it may concern:*

Be it known that I, FRANK D. GRANGER, a citizen of the United States, residing in the city, county, and State of New York, have invented certain new and useful Improvements in Locks for Firearms, of which the following is a full, clear, and exact description.

My invention relates to improvements in trigger mechanism for guns, and especially to mechanism by which a double-barrel gun may be operated by means of a single trigger.

The object of my invention is to produce a simple, safe, and reliable mechanism by which guns having more than one barrel may be operated by a single trigger, to produce a safety-catch by means of which the trigger mechanism may be locked so that the gun cannot be accidentally fired, to provide an indicating device which will always indicate which barrel is to be exploded, and to provide means for firing the desired barrel.

To this end my invention consists in certain novel features and combinations of parts, which will be hereinafter described and claimed.

Reference is to be had to the accompanying drawings, forming part of this specification, in which similar letters of reference indicate corresponding parts in all the figures.

Figure 1 is a broken vertical longitudinal section, partly in elevation, showing a mechanism embodying my invention. Fig. 2 is a broken plan of the same. Fig. 3 is a detail plan view of the firing-disk, showing the manner in which the lock-sears are released. Fig. 4 is an inverted plan of the firing-disk, and Fig. 5 is a broken detail view of the firing-disk and one of the indicating-pins.

A is the breech of the gun, which is of the usual construction, and extending downward into the breech from the top is a hollow bracket *a*, in which is mounted vertically a pin B, which projects upward through the top of the breech, and which is normally held upward by a spring *b*, one end of which is secured to the hollow bracket and the other end to the pin. The pin B extends downward through the hollow bracket, and on the lower end of the pin is mounted loosely the firing-disk C, which has on its end surface as distinguished from its periphery and near the edge a series of regularly-spaced cam-teeth C′, the inclined sides of which are all in the same direction, and the teeth are adapted to alternately raise the sears D and release the hammers as the disk rotates horizontally. It will be seen by reference to Fig. 3, that the sears are placed in relation to these teeth so that the sears will be alternately raised, and, as there are five teeth on the disk, one or the other of the sears will be raised every time the disk is moved a tenth of a revolution. The number of teeth on the disk, however, is not material, as any desired number may be used.

To illustrate the construction of the mechanism I have shown the sears D and D′ connected with a simple form of hammer and tumbler, but it is obvious that they may be connected with any of the common forms in the usual way. As shown, the hammers $D^2$ are formed into tumblers at their lower ends, on which are shoulders *d* and *d′*, which are engaged by the forward ends of the sears, and the hammers are pressed forward by springs $D^3$, which are connected therewith, and which are secured in the lock-case, the front ends of the sears being held in engagement with the tumblers by springs $d^2$. It will thus be seen that the ends of the sears will engage the shoulders on the tumblers and hold the hammers in cocked position, and when the sears are raised at their rear ends by the teeth C′ their forward ends will be lowered so as to release the hammers. On the under side of the disk C are a series of ratchet-teeth $C^2$, which radiate from the central portion of the hub, there being twice as many of these teeth as there are of the cam-teeth on the upper surface of the disk, and the object of these teeth is to engage the trigger-pawl so that when the pawl is pushed forward it will revolve the disk.

A trigger E of common form is pivoted in the slot *a′* on the under side of the breech in the usual manner, and is protected by the ordinary trigger-guard A′ and held forward by a spring F pressing on the shoulder *e* of the trigger in the usual manner. The upper end of the trigger is provided with a pawl G, which is pivoted thereto, and which extends forward and upward through a slot *h* in the guide H, which is supported on the inner portion of the breech, and the forward end of the pawl G is held in engagement with the ratchet-teeth of the disk by means of a curved spring $h'$, the free end of which presses against the under side of the pawl and the lower portion of which is secured to the guide H. It will thus be seen that when the trigger is pulled to fire the gun the upper end of the trigger will be thrown forward, thus pushing the pawl G forward and causing it to turn the disk C, and when the disk is turned one of the inclined cam-teeth C′ will engage a sear D or D′, raise the sear, and fire the gun.

In Fig. 3, one of the sears D′ is shown just after it has passed a tooth C′, and the opposite sear D is in position to ascend the incline of another tooth C′, but if, for any reason, it is desired to fire the barrel, which will not normally be fired by a sear D, D′, the pin B may be pressed downward, thus carrying down the disk C with it, and this movement will cause the pawl G to swing on its pivot or fulcrum, thus pushing the disk around one notch, so that by manipulating the pin the disk may be brought into a desired position to fire either barrel. When the disk is turned in this manner, the teeth C′ will be brought below and out of engagement with the sears D, D′, so that the revoluble movement of the disk will not actuate the sears.

The disk C may be locked so that the gun cannot be accidentally fired by means of the safety-catch secured in the breech behind the pin B, which catch comprises a slide-block J, held to slide in the slot $a^2$ of the breech and provided with a finger-piece $j$, to facilitate its adjustment and a depending arm J′, secured to the block and terminating at its lower end in a forward bend $j'$, the bent end being adapted to enter one of the notches $c$ of the disk C, and it will be seen that when the bent end of the arm is in engagement with the disk, the disk cannot be turned. When the gun is to be used, the safety-catch may be pushed rearward, thus freeing the catch.

An indicator is used in connection with the invention to show which barrel is about to be exploded, and the indicator comprises two spring-pressed pins $k$, which project upward through the breech of the gun. Supporting arms K are provided on both sides of the hollow bracket $a$, each terminating in a box K′, containing a spring pressed pin $k$. The pins $k$ will thus be held on opposite sides of the center pin B, and the lengths of the arms K are such that the pins will align vertically with the teeth C′ on the firing disk. The upper ends of the pins rest normally in sockets $a^3$ in the top of the breech. The length of the pins is such that they will extend downward into the path of the teeth C′ on the disk, and the pins are placed so that they will alternately engage the teeth, so that when the disk is revolved first one pin will strike a tooth and then another, and the pins will move up the inclined surfaces of the teeth and be alternately projected above the top surface of the breech, and these will thus indicate which barrel is about to be fired. If the right hand pin projects upward, it will show that the right-hand barrel is to be fired, and if the gunner wishes to fire the left-hand barrel he pushes the pin B downward, thus causing the disk C to revolve the distance of one tooth in the manner described above, and the firing-disk will thus be brought into position to fire the left-hand barrel.

Having thus fully described my invention, I claim as new and desire to secure by Letters Patent—

1. A trigger mechanism for guns, comprising a revoluble disk mounted upon a vertical axis and having cam-teeth upon its end face to engage and operate the lock sears during the revolution of the disk, and a trigger connected with said disk for turning the same, substantially as described.

2. A trigger mechanism for guns, comprising a revoluble disk, mounted on a vertical axis and having cam-teeth upon its end face adapted to be moved in horizontal planes to actuate the lock sears during the revolution of the disk, and a trigger mechanism for turning the disk, substantially as described.

3. A trigger mechanism for guns, comprising a revoluble disk mounted upon a vertical axis and having cam-teeth upon its end face to engage and operate the lock sears during the revolution of the disk, and also having ratchet teeth to engage the trigger pawl, a trigger pivoted in the breech, and a pawl pivoted to the trigger and having its end in engagement with the ratchet teeth of the disk, substantially as described.

4. A trigger mechanism for guns, comprising a revoluble disk mounted upon a vertical axis and having cam-teeth on one end face to engage the lock-sears and ratchet-teeth on the opposite end face to engage the trigger-finger, a trigger pivoted in the breech, and a finger pivoted at one end to the trigger and having its opposite end in engagement with the teeth of the disk, substantially as described.

5. A trigger mechanism for guns, comprising a horizontal revoluble disk mounted on a vertically-movable support and provided on its upper end face with inclined cam teeth to engage the lock-sears and on its under end face with a series of teeth, a trigger pivoted in the lower portion of the breech, and a pawl pivoted at one end to the trigger and having its other end in engagement with the lower teeth of the firing-disk, substantially as described.

6. A trigger mechanism for guns, comprising a horizontally-revoluble firing-disk having inclined cam-teeth on its upper end surface to engage the lock-sears and having a series of teeth on its under end surface, a trigger pivoted in the breech and provided with a pawl having one end pivoted to the trigger and the opposite end in engagement with the lower teeth of the firing-disk, and a guide for the finger, substantially as described.

7. A trigger mechanism for guns, comprising a revoluble and vertically-movable disk having teeth on its upper end surface to engage the lock-sears, and means for revolving said disk by the movement of the trigger, substantially as described.

8. A trigger mechanism for guns, comprising a hollow bracket in the interior of the breech, a spring-pressed pin mounted in the bracket and projecting through the breech-top, a revoluble disk mounted on the lower end of the bracket and provided on its upper end face with cam-teeth to engage the lock-sears and on its lower end face with a series of teeth, a trigger pivoted in the breech, and a pawl pivoted to the trigger and extending into the path of the lower disk-teeth, substantially as described.

9. In a trigger mechanism, the combination, with the firing-disk provided with teeth to engage and operate the lock sears and having notches in the edge, of a safety-catch slidably mounted in the breech and having a projecting end to engage the disk-notches, substantially as described.

10. In a trigger mechanism, the combination, with the revoluble firing-disk having cam-teeth on the end face thereof, of spring-pressed indicating pins mounted in the path of the teeth and extending upward through the breech, substantially as described.

11. The combination with a plurality of hammers and sears, and means for releasing the latter, of a horizontal disk provided with cam teeth and vertical indicating pins situated above the path of said cam teeth and adapted to be elevated thereby alternately, substantially as set forth.

FRANK D. GRANGER.

Witnesses:
HENRY F. PARKER,
CLARENCE R. FERGUSON.